United States Patent [19]

Cronin

[11] Patent Number: 5,742,430
[45] Date of Patent: Apr. 21, 1998

[54] DISPLACEABLE DOUBLED-OVER SHEET CONFIGURATION, USEFUL PARTICULARLY FOR A VARIABLE LIGHT TRANSMISSION DEVICE

[75] Inventor: David V. Cronin, Peabody, Mass.

[73] Assignee: Polaroid Corporation, Cambridge, Mass.

[21] Appl. No.: 681,900

[22] Filed: Jul. 29, 1996

[51] Int. Cl.[6] .................. G02B 5/30; G02B 27/28; B60J 3/00
[52] U.S. Cl. .................. 359/493; 359/501; 296/97.2; 296/97.6
[58] Field of Search ................... 359/493, 501; 296/97.2, 97.6, 97.8; 40/434, 491, 539, 548

[56] References Cited

U.S. PATENT DOCUMENTS

| | | |
|---|---|---|
| 2,237,566 | 11/1941 | Land . |
| 2,281,112 | 4/1942 | Ryan . |
| 2,291,347 | 7/1942 | Ryan . |
| 2,311,840 | 2/1943 | Land . |
| 2,856,810 | 10/1958 | Frost ............................ 296/97.2 |
| 2,915,936 | 12/1959 | Winchell ....................... 359/501 |
| 3,358,811 | 12/1967 | Gerrish ......................... 198/182 |
| 3,473,867 | 10/1969 | Byrnes . |
| 3,838,767 | 10/1974 | Taylor .......................... 198/815 |
| 4,123,141 | 10/1978 | Schuler ......................... 359/497 |
| 4,202,443 | 5/1980 | Bührer .......................... 198/831 |
| 4,846,338 | 7/1989 | Widmer ......................... 198/831 |
| 4,896,901 | 1/1990 | Ekelund ......................... 283/90 |

*Primary Examiner*—Paul M. Dzierzynski
*Assistant Examiner*—Mark A. Robinson
*Attorney, Agent, or Firm*—Renato M. de Luna

[57] ABSTRACT

A device is provided including a flexible sheet having extents encompassing at least a circular area, said flexible sheet doubled-over upon itself through the center of the circular area such that the resultant respective halves of said circular area overlap and form a semicircular field of view; and a sleeve for maintaining the overlapping configuration of said doubled-over flexible sheet, yet allowing said flexible sheet to be displaced about the center of said circular area within the doubled-over configuration. In a particular embodiment, the encompassed circular area of said flexible sheet has at least one light-transmissive region within the circular area, such that transmission of light through the aforementioned field of view can be varied by said displacement of the flexible sheet within said doubled-over configuration. Such embodiment, when employing a polarizing sheet as said flexible sheet, can be used as a variable light transmission device.

19 Claims, 12 Drawing Sheets

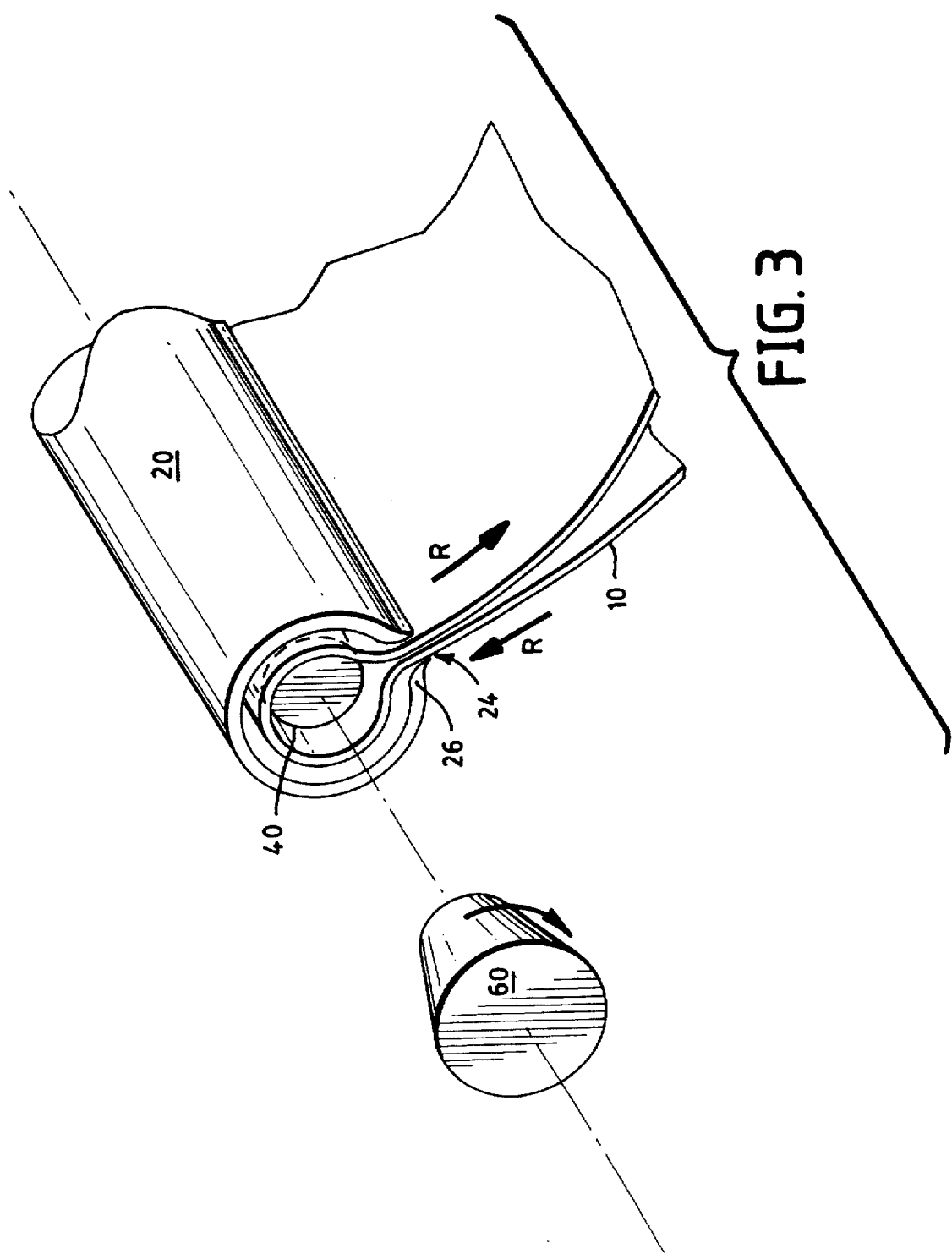

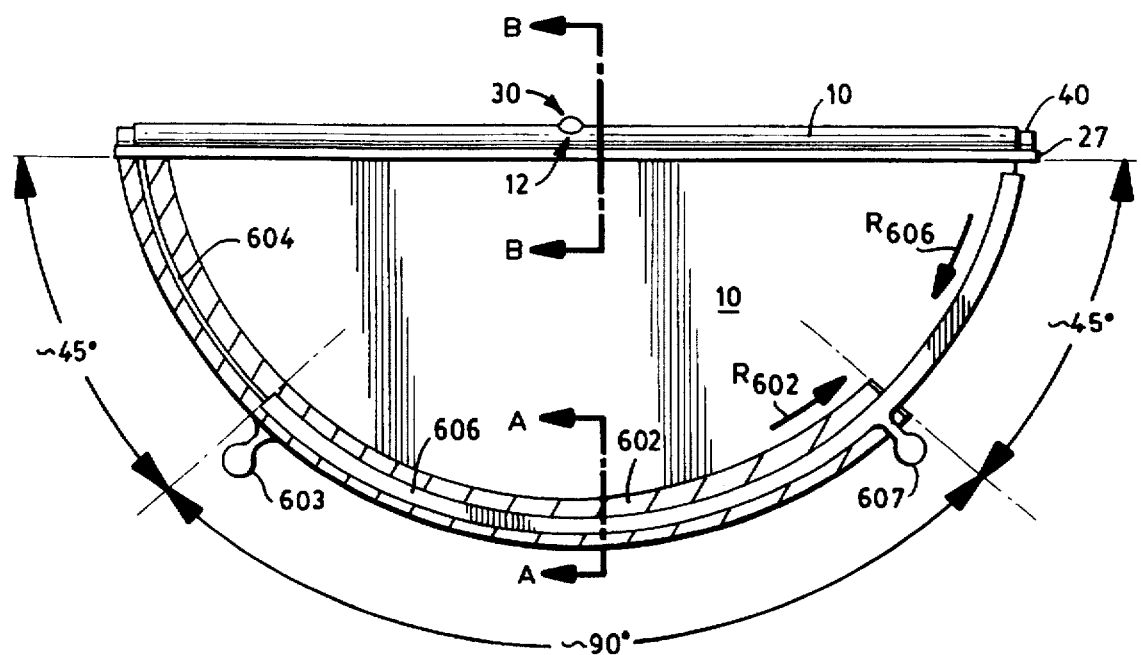
FIG. 7
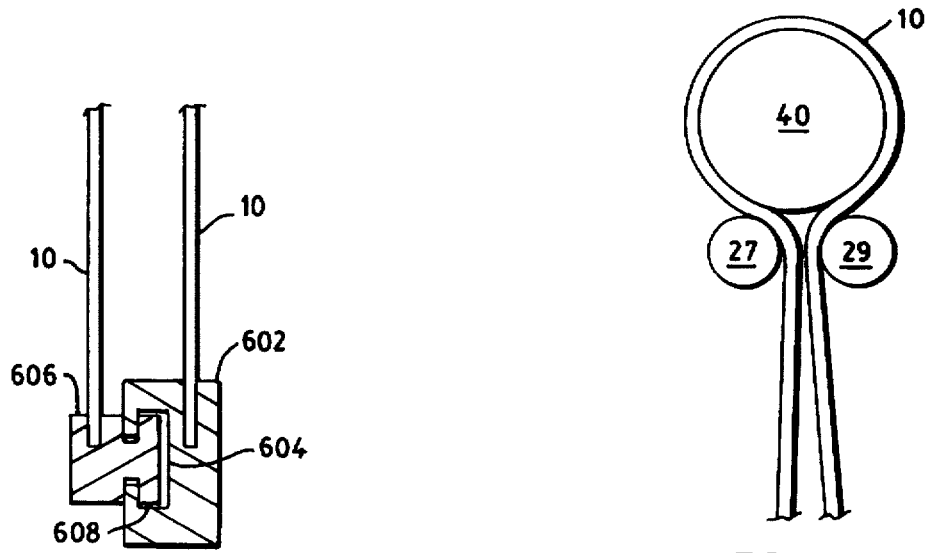
FIG. 8
FIG. 9

DISPLACEABLE DOUBLED-OVER SHEET CONFIGURATION, USEFUL PARTICULARLY FOR A VARIABLE LIGHT TRANSMISSION DEVICE

FIELD OF THE INVENTION

The present invention relates generally to articles of manufacture incorporating a "doubled-over" flexible sheet, said articles being operated principally by the manipulation or actuation of manual or automized means for displacing arcuately said sheet within its doubled-over configuration. More particularly, the present invention relates to a variable light transmission device incorporating said arcuate displacement means and said doubled-over rotatable flexible sheet, wherein said flexible sheet is a synthetic linear light polarizer.

BACKGROUND

The production of linear light polarizing films has been well described in the art. Linear light polarizing films, in general, owe their properties of selectively passing radiation vibrating along a given electromagnetic vector (and absorbing electromagnetic radiation along a second given electromagnetic radiation vector) to the anisotropic character of the transmitting film medium. As examples of light polarizing material, mention may be made of U.S. Pat. Nos. 2,237,567 and 2,328,219, issued to Edwin H. Land, which disclose polarizers prepared by staining a molecularly oriented material so as to render the plastic material dichroic, e.g., polarizers formed by staining a molecularly oriented sheet of polyvinyl alcohol with iodine.

Several useful optical ends and effects can be accomplished with plane polarized light. For example, by employing a pair of light polarizing materials, the intensity of light transmitted therethrough can be controlled variably from a maximum possible transmission to total extinction or cutoff, depending upon the relationship of the polarizing or transmission axes of the respective polarizing materials. When the polarizing axes of the two polarizing materials are parallel, a maximum of light is transmitted; whereas when the polarizing axes are "crossed" or at right angles, substantially complete "cut off" (cf., light extinction, absorption) can be obtained.

The phenomena of crossing/uncrossing polarizing axes has been used in the past in the design of so-called variable density windows. Mention may be made of U.S. Pat. No. 2,237,566, issued to E. H. Land on Apr. 8, 1941; U.S. Pat. No. 2,281,112, issued to W. H. Ryan on Apr. 28, 1942; U.S. Pat. No. 2,291,347, issued to W. H. Ryan on Jul. 27, 1942; U.S. Pat. No. 2,311,840, issued to E. H. Land on Feb. 23, 1943; U.S. Pat. No. 3,473,867, issued to E. G. Byrnes on Oct. 21, 1969; and U.S. Pat. No. 4,123,141, issued to N. W. Schuler on Oct. 31, 1978.

While the mechanisms disclosed in the aforementioned patents are well-suited for their respective purposes, continuing need exists for alternative means for effecting light intensity variation in variable light transmission devices.

SUMMARY

In accord with the above-mentioned need, a variable light transmission device has been designed for effective control of light intensity variation in a semicircular field of view, and which need utilize only a single flexible sheet of polarizing material. Without limitation to any optical phenomena underlying transmission variation, such variable light transmission device can be summarized as incorporating a flexible sheet having extents encompassing a circular area and at least one light-transmissive region within said circular area. The flexible sheet is doubled-over upon itself along the center of said circular area such that the respective resultant halves of said circular area overlap and form a (preferably seamless) semicircular field of view. Fold-forming means are provided for maintaining the overlapping configuration of said doubled-over flexible sheet, yet allowing said flexible sheet to be displaced arcuately about the center of said circular area within its doubled-over configuration. By displacing the flexible sheet arcuately about the center, the transmission of light through said field of view can be varied by said displacement of said doubled-over flexible sheet. In the preferred configuration, the flexible sheet is a synthetic, linear light polarizing sheet.

In an article or device aspect, the present invention includes, without limitation to any particular intended use, a device comprising a flexible sheet having extents encompassing a circular area, said flexible sheet being doubled-over upon itself along the center of said circular area such that the respective resultant halves of the circular area overlap to form seamlessly a first and a second semicircular region, and wherein fold-forming means are provided to maintain said overlapping configuration, yet allowing the flexible sheet to be displaced arcuately about said center within said overlapping configuration.

In light of the above, it is the general object of the present invention to provide a system for conveying a flexible sheet in a doubled-over circuit about a central pivot point, useful among other things for a variable light transmission device, a semi-circular variable information display window, or a conveyance system.

It is a particular object of the present invention to provide said variable light transmission device.

It is another particular object of the present invention to provide a variable light transmission device useful as a supplementary (or primary) automobile visor.

It is another particular object of the present invention to provide a variable light transmission device useful as an automotive sunshield.

These and other objects of the present invention will become clearer in light of the following description considered in conjunction with the attached drawings.

BRIEF DESCRIPTION OF THE DRAWINGS

Each of FIGS. 1 to 15 provide schematic representational illustrations. The relative locations, shapes, and sizes of objects are exaggerated to facilitate the discussion and presentation herein.

FIG. 3 illustrates generically means for frictionally urging the displacement of a doubled-over flexible sheet.

3

Figure 4:
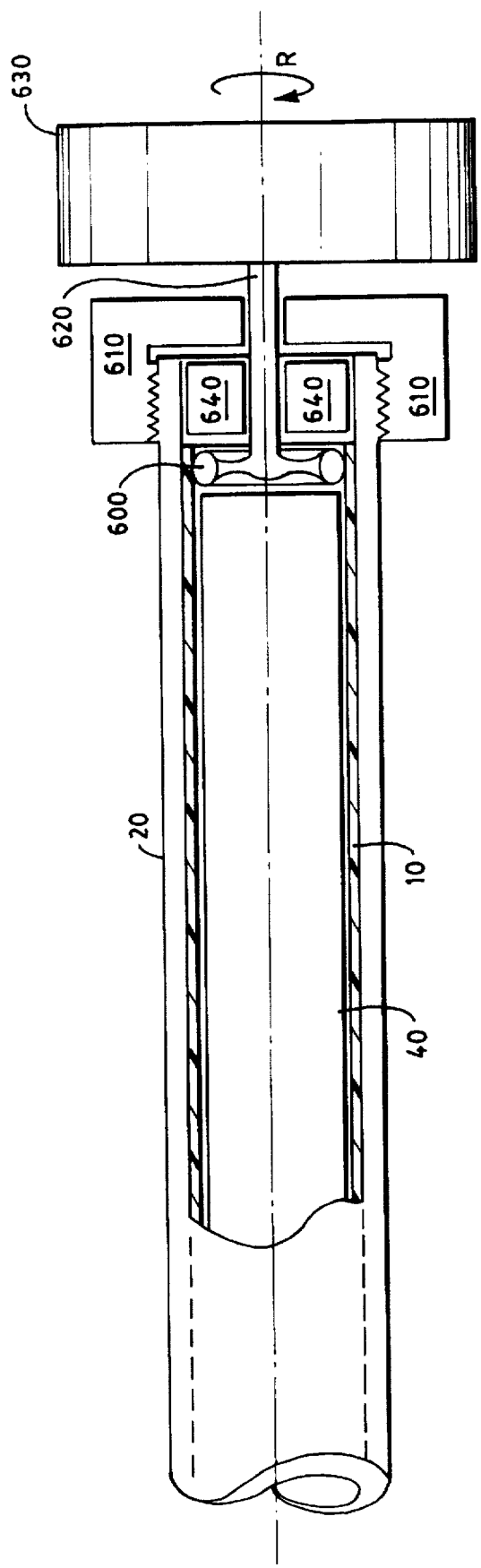

FIG. 4 illustrates a particular means for frictionally urging the displacement of a doubled-over flexible sheet.

Figure 5:
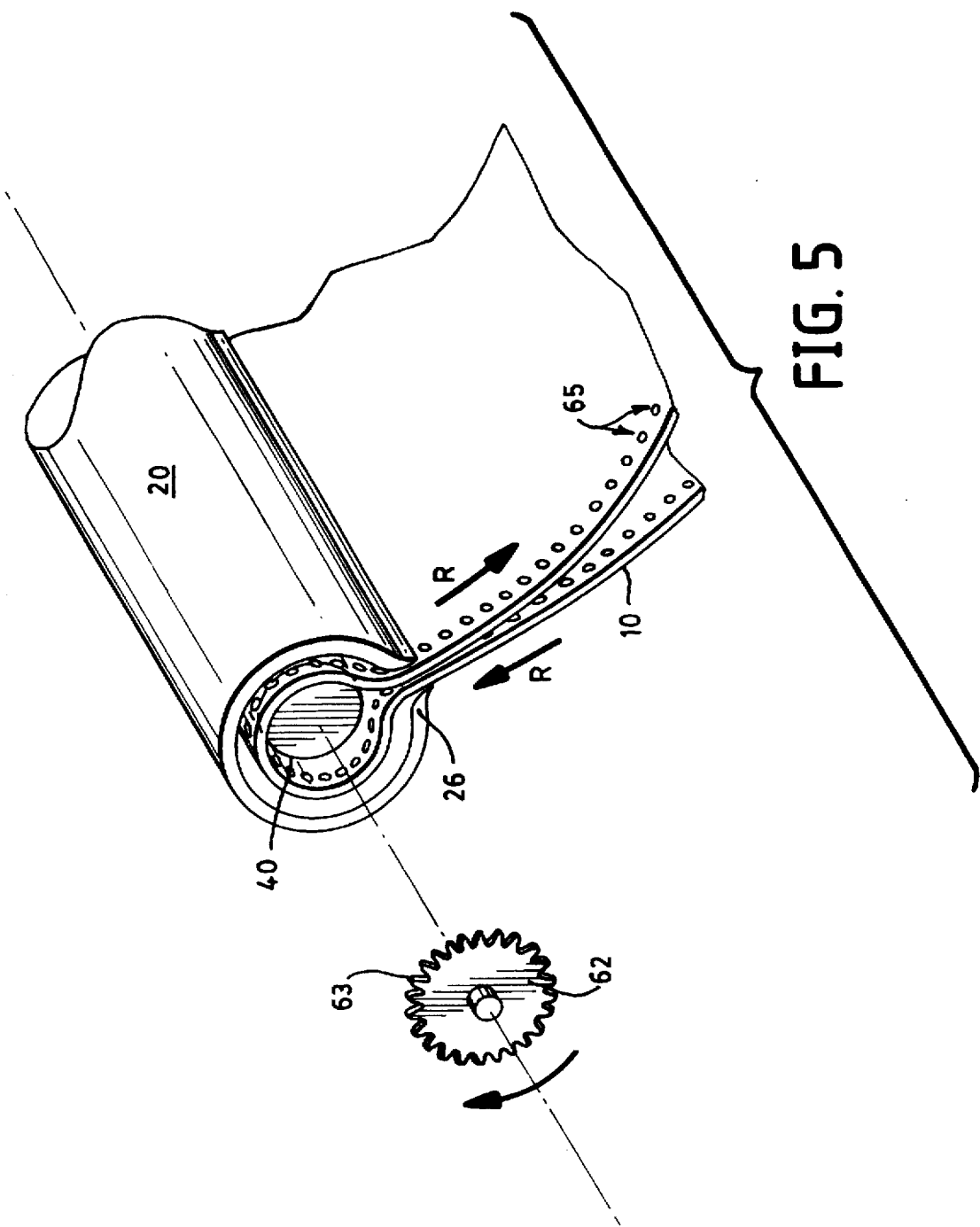

FIG. 5 illustrates generically sprocket means for urging the displacement of a doubled-over flexible sheet, the flexible sheet having cooperating peripheral perforations.

Figure 6:
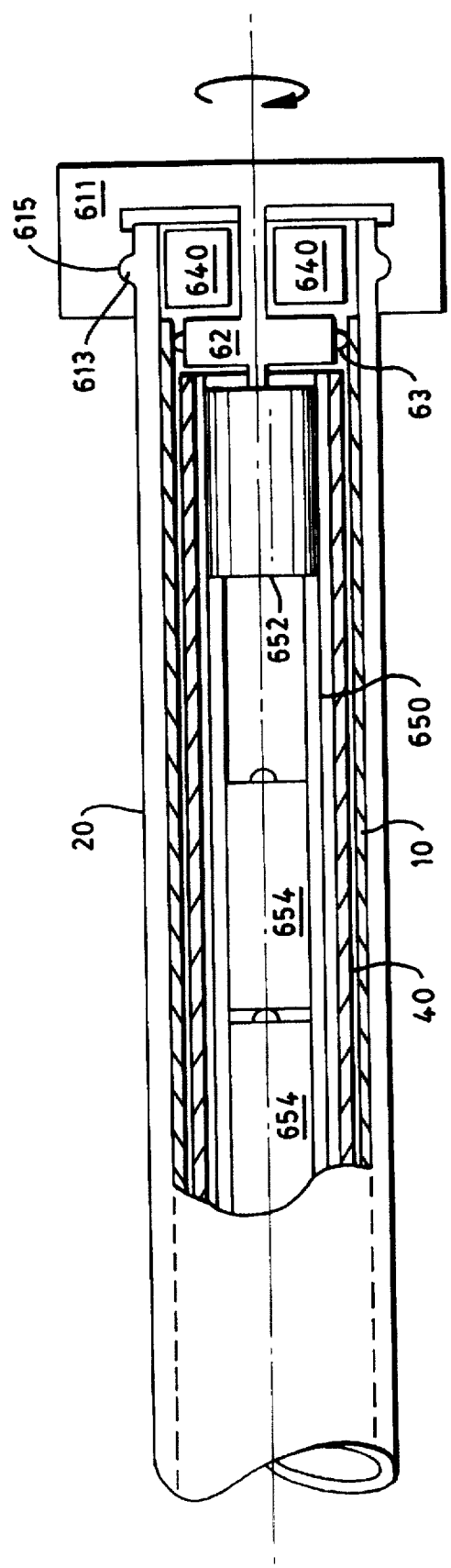

FIG. 6 illustrates particular motorized sprocket means for urging the displacement of a doubled-over flexible sheet.

FIG. 7 illustrates another embodiment of the present invention utilizing sliding frame means for urging the displacement of a doubled-over flexible sheet.

FIG. 8 illustrates a cross-section of the sliding frame means illustrated in FIG. 7 viewed along sectional line A—A.

FIG. 9 illustrates a cross-section of restraining means used for the embodiment illustrated in FIG. 7, viewed along sectional lines B—B.

Figure 10:
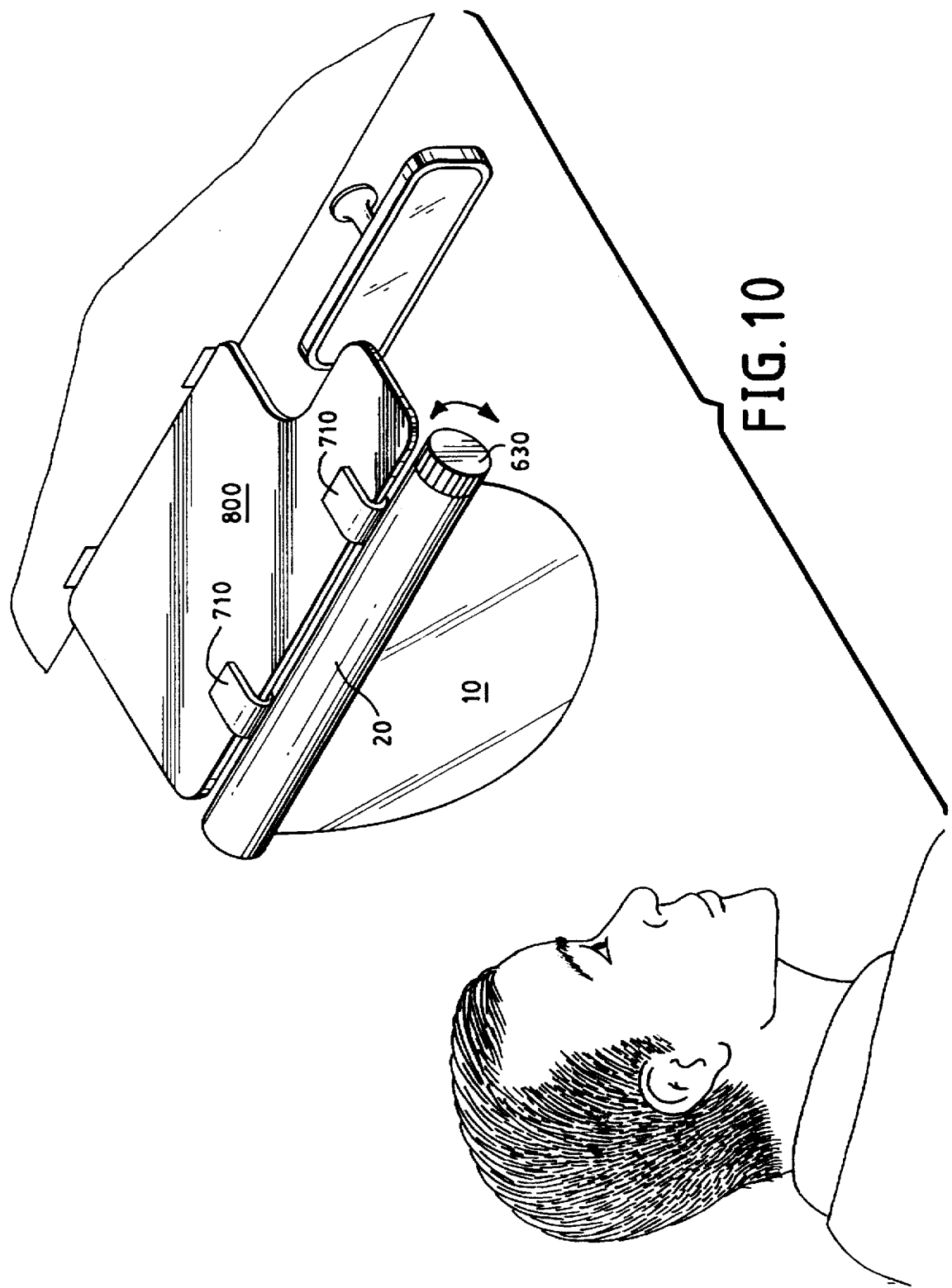

FIG. 10 illustrates an embodiment of a variable light transmission device according to the present invention, the device designed for and used as a supplementary car visor.

Figure 11:
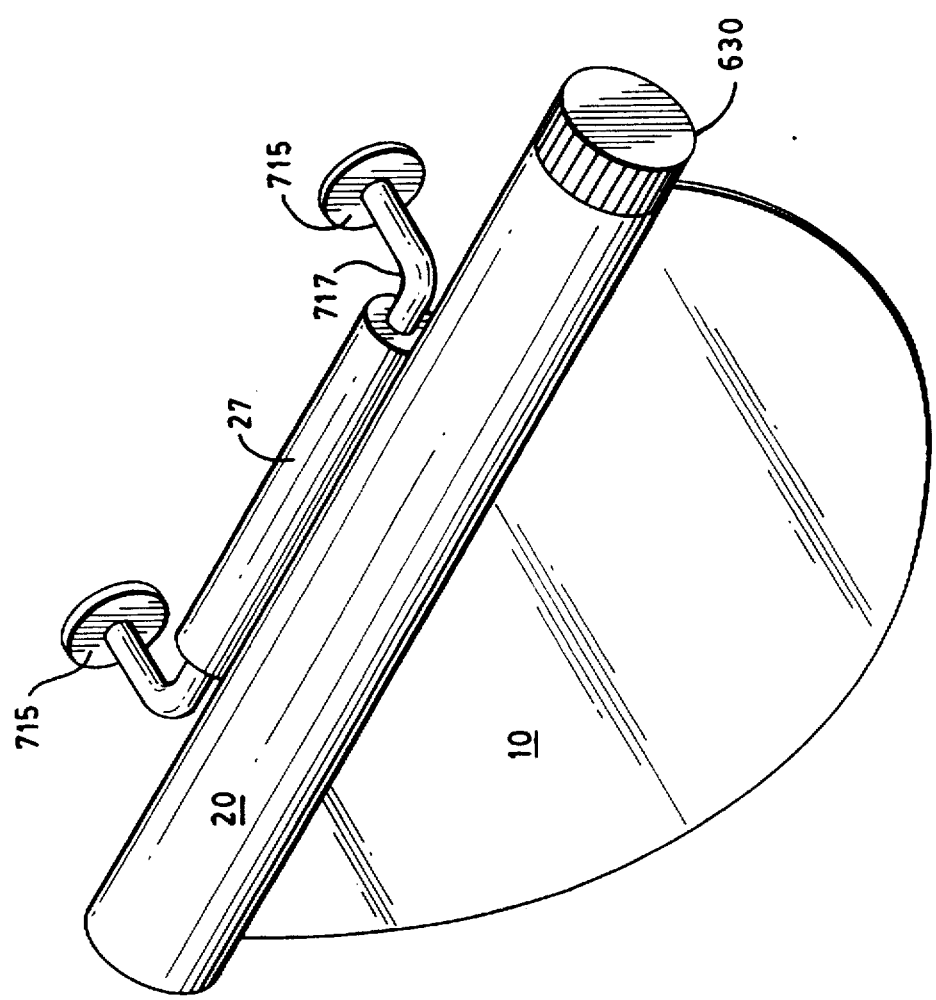

FIG. 11 illustrates an embodiment of a variable light transmission device according to the present invention, the device configured for attachment to relatively flat surfaces, such as a car's front, side, or rear windows.

Figure 12:
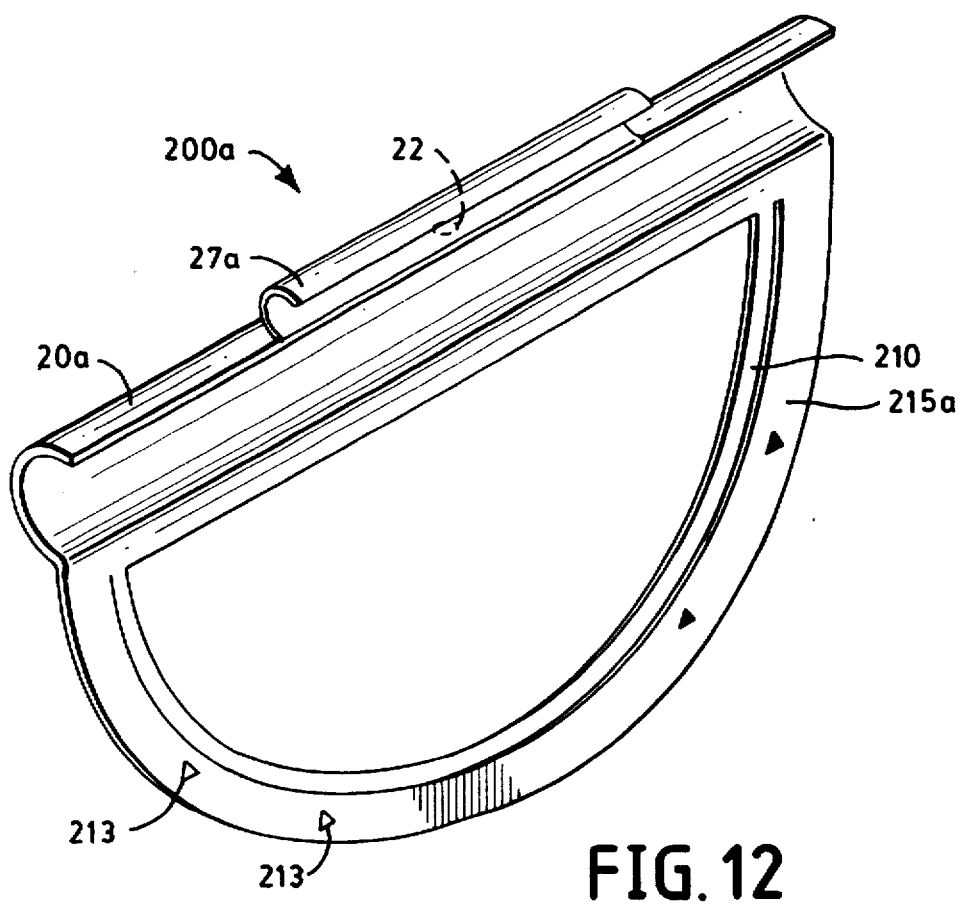

FIG. 12 illustrates one side of a restraining means useful for designing a variable light transmission device as a supplementary car visor, in accordance with an embodiment of the present invention.

Figure 13:
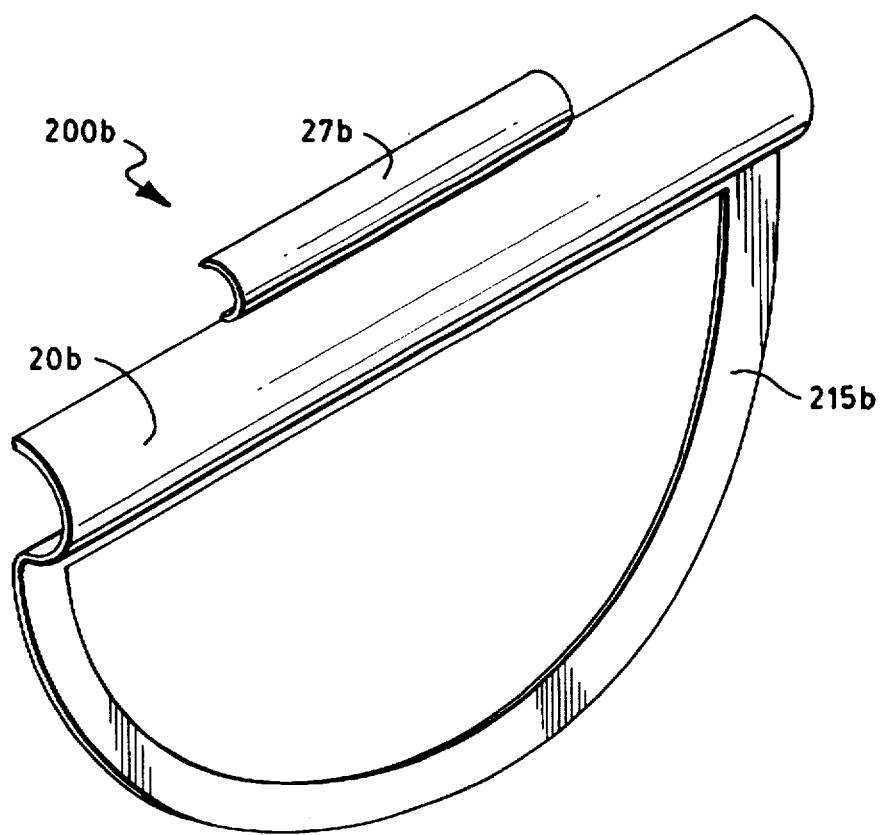

FIG. 13 illustrates the other complementary side of the restraining means illustrated in FIG. 12.

Figure 14:
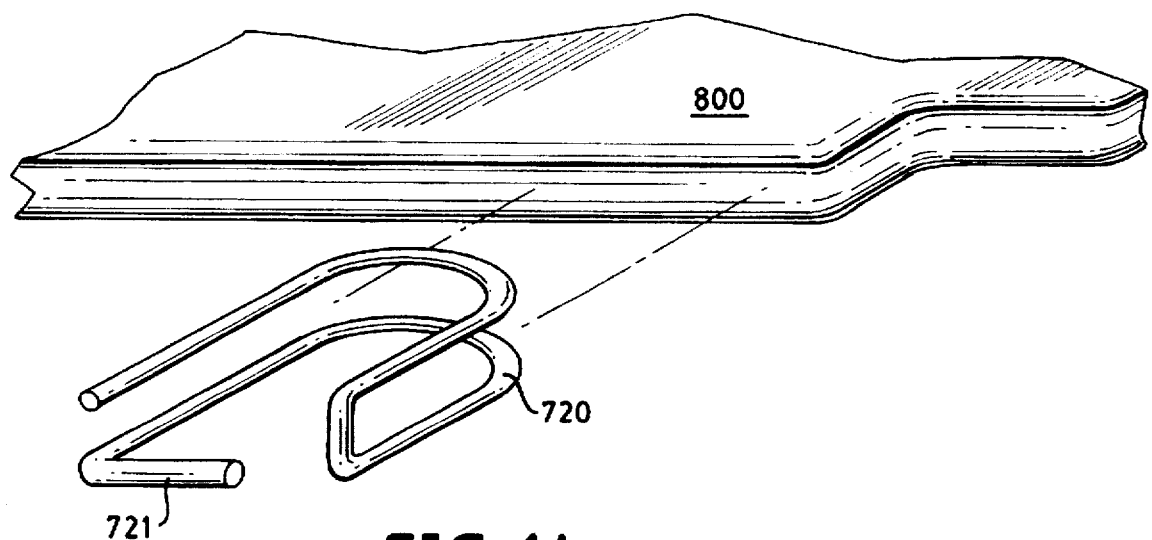

FIG. 14 illustrates attachment means useful for mounting a supplementary car visor, such as depicted in FIGS. 12 and 13, to an existing car visor.

Figure 15:
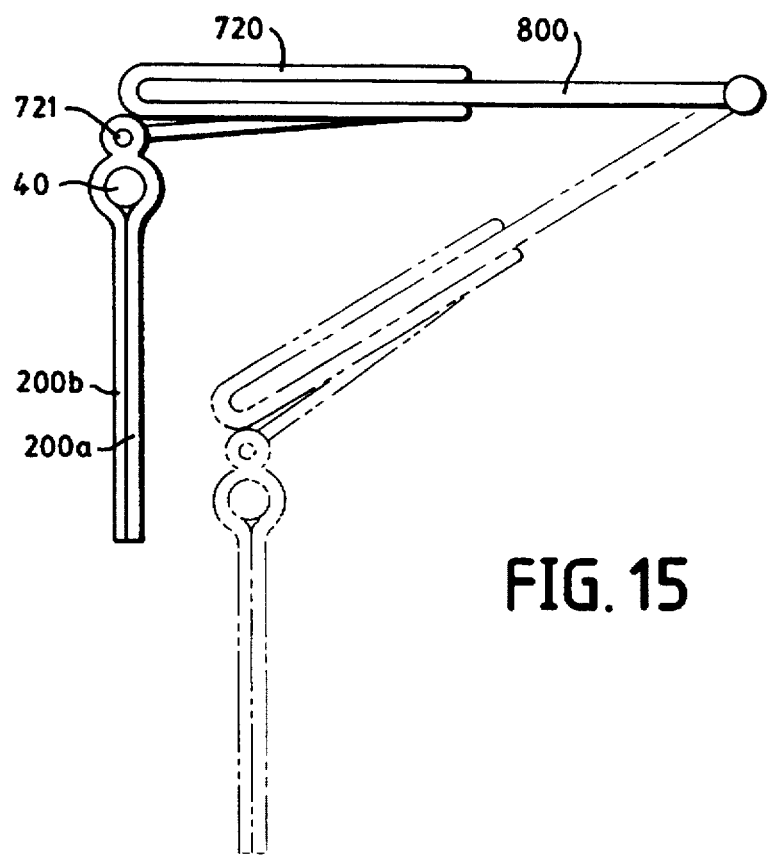

FIG. 15 illustrates an example of the use and operation of a supplementary car visor utilizing the attachment means depicted in FIG. 14.

DETAILED DESCRIPTION OF THE INVENTIVE SUBJECT MATTER

The present invention provides several product embodiments, representative examples of which are illustrated in the several drawings.

In general, however, the present invention is drawn to a device incorporating and using a flexible sheet displaceable within a doubled-over configuration. The device can be defined as one comprising a flexible sheet having extents encompassing a circular area, said flexible sheet being doubled-over (alternatively, "folded") upon itself along the center of said circular area such that the respective resultant halves of said circular area (cf., "flaps") overlap to form (preferably, seamlessly) first and second semicircular regions, and wherein fold-forming means are provided to maintain the overlapping configuration of said doubled-over flexible sheet, while allowing said flexible sheet to be displaced arcuately (alternatively, "rotated") about the center of said circular area within said overlapping configuration. Several embodiments are contemplated, for example, variable light transmission devices, variable information display devices, and the like.

In a particular and desirable embodiment, the device is embodied as a variable-light transmission device, useful, for example, as a primary or supplementary car visor. See, e.g., FIGS. 10 to 15. Consistent with the broader definition of the present invention, said variable light transmission device comprises a flexible sheet 10 having extents encompassing

4 a circular area 11 and at least one light-transmissive region within said circular area, said flexible sheet 10 doubled-over upon itself along the center of said circular area (see hole 12) such that the respective resultant halves of said circular area overlap to form a first and a second semicircular region, which together produce a field of view. Fold-forming means are further provided to maintain the overlapping configuration of said doubled-over flexible sheet 10, yet allowing said flexible sheet 10 to be displaced arcuately about the center of said circular area. By arcuately displacing the flexible sheet about the center of the circular area, the intensity of light transmitted through said field of view can be varied from a predetermined minimum to a predetermined maximum.

Figure 1A:
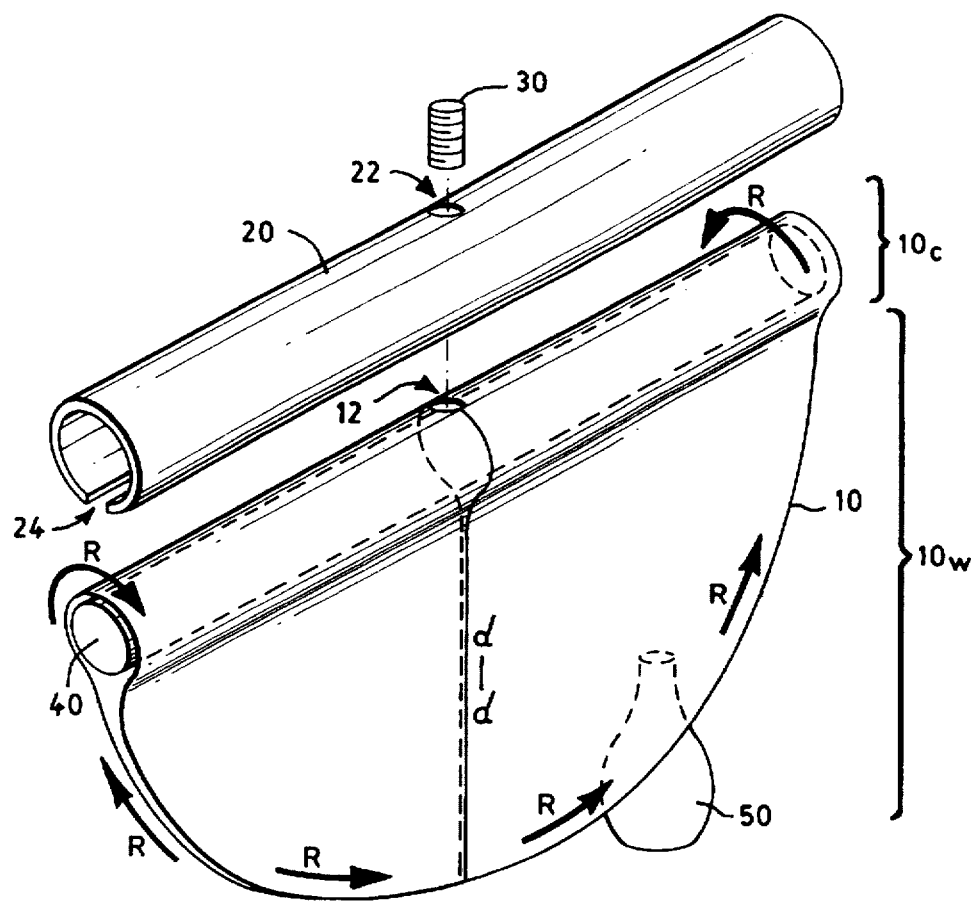
FIG. 1A is an exploded view illustrating the present invention embodied as a variable light transmission device, the variable light transmission device being depicted in a state of high light transmission.
Figure 1B:
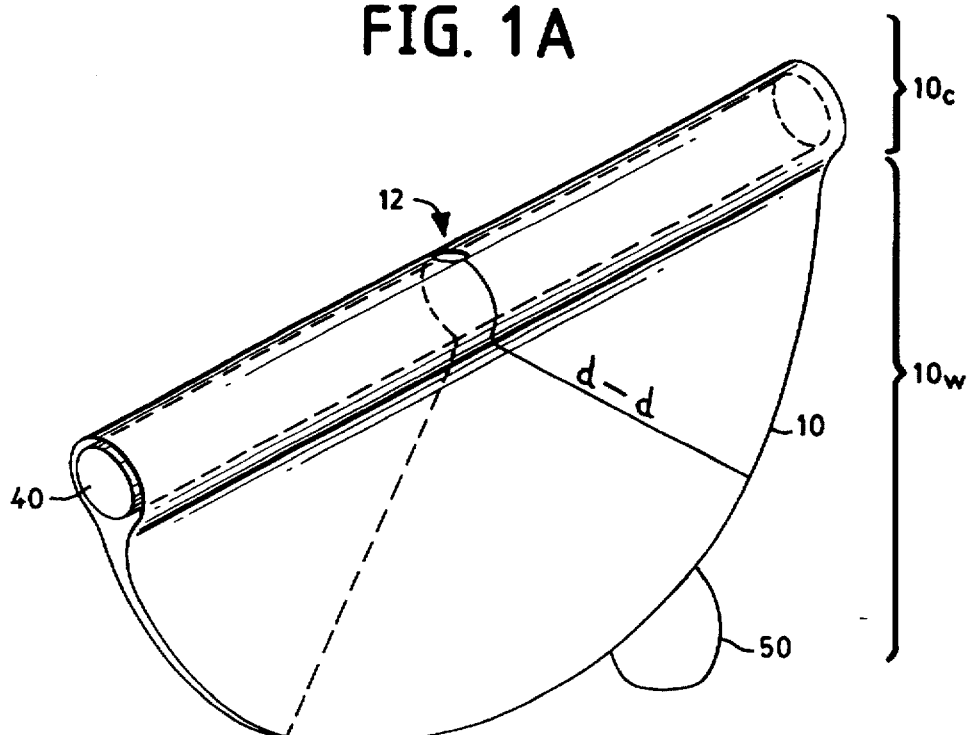
FIG. 1B is an exploded view illustrating the embodiment shown in FIG. 1A, wherein the variable light transmission device is depicted in a state of low light transmission (i.e., high light extinction).

Operation of the variable light transmissive device is presented in FIGS. 1A and 1B.

Figure 2:
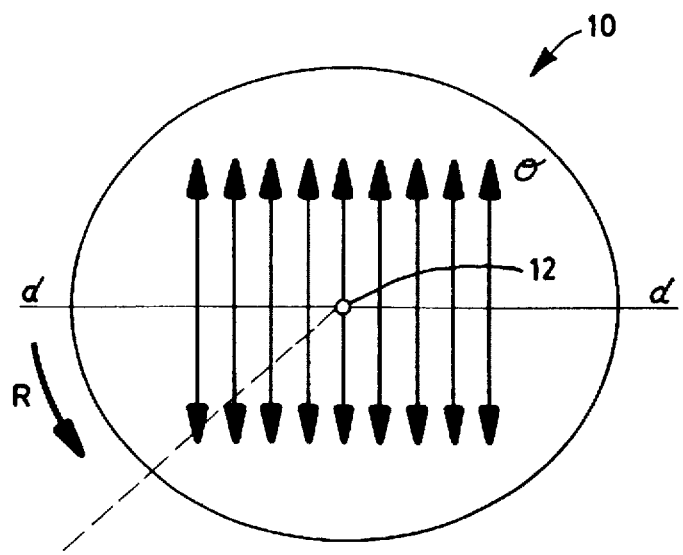
FIG. 2 illustrates a flexible, light polarizing sheet used in the manufacture of the variable light transmission device shown in FIGS. 1A and 1B.

In FIG. 1A, the variable light transmission device is shown comprising a light polarizing flexible sheet 10 doubled-over a cylindrical internal guide 40. As seen in FIG. 2, light polarizing flexible sheet 10—removed from the variable light transmission device and unfolded—has a substantially circular profile and a hole (or aperture) 12 at its center. The polarizing axis of flexible sheet 10 is depicted by arrows o, which—for purposes of illustration only—is depicted perpendicular to arbitrary reference line d—d intersecting hole 12. As shown in FIG. 1A, flexible sheet 10—when assembled into the variable light transmission device—is doubled-over such that the polarizing axis o of the overlapping posterior and anterior flaps comprising the resultant substantially semicircular viewing window $10_w$ are parallel. In this initial state, light transmission through viewing window $10_w$ remains comparatively unhindered, allowing a comparatively clear view therethrough of object 50.

In contrast, when the flexible sheet 10 is displaced relative to hole 12 by "rotating" said sheet 10 (e.g., by 45°) about hole 12 in the direction R within the doubled-over configuration, the polarizing axes o of overlapping posterior and anterior flaps gradually and angularly diverge, and ultimately become perpendicularly crossed. Accordingly, the light transmitted through viewing window $10_w$ becomes gradually attenuated and ultimately reaches a state of maximum light extinction, thus darkening or otherwise reducing one's view therethrough of object 50. Since a 45° arc of motion at the rim of the anterior flap of the flexible sheet 10 effects a correspondent countermotion of the same magnitude at the posterior flap, axes angles ranging from 0° to 90° can be accomplished, affording a full "light/dark" cycle.

In the embodiment shown, fold-forming means for maintaining the overlapping configuration of the doubled-over flexible sheet is provided principally by slotted sleeve 20. In this regard, it will be appreciated that certain flexible sheets, when doubled over, have a tendency to outwardly unfold. The provision of a slotted sleeve 20 "clamps" the flexible sheet 10 into a desired U-like or bent-over shape, the opposing walls (see elements 26 in FIG. 3) thereof preventing the outward unfolding of sheet 10.

As the displacement of the flexible sheet 10 occurs relative to a central point, it is advantageous to reduce the skewing (or other such movement) of the flexible sheet relative to the central point. Toward this end, in a preferred embodiment, a spindle 30 is provided on slotted sleeve 20, extending internally and inserted into the hole 12 provided on flexible sheet 10. In this manner, both lateral and radial displacement is restricted, without meaningful interference with arcuate circumferential displacement. If an internal cylindrical guide 40 is utilized, spindle 30 should not extend into or otherwise interfere with guide 40 in a manner that restricts its compensatory rotation (or like motions) during arcuate sheet displacement, otherwise friction against the sheet 10 can become unacceptable.

While the use of a slotted sleeve 20 is preferred for the variable light transmission device illustrated in FIG. 1A, other equivalent fold-forming means can be substituted. For example, in FIGS. 7 and 9, fold-forming is accomplished by the use of paired dowels 27 and 29. Paired dowels 27 and 29 abut against the respective sides of the doubled-over flexible sheet 10 as the 10 sheet is wrapped about internal cylindrical guide 40. As with the opposing walls 26 of slotted sleeve 10, the paired dowels 27 and 29 also function to bring (or maintain) together the flaps of the flexible sheet 10, preventing any natural tendency or inclination to outwardly unfold or be unfolded.

Figure 2A:
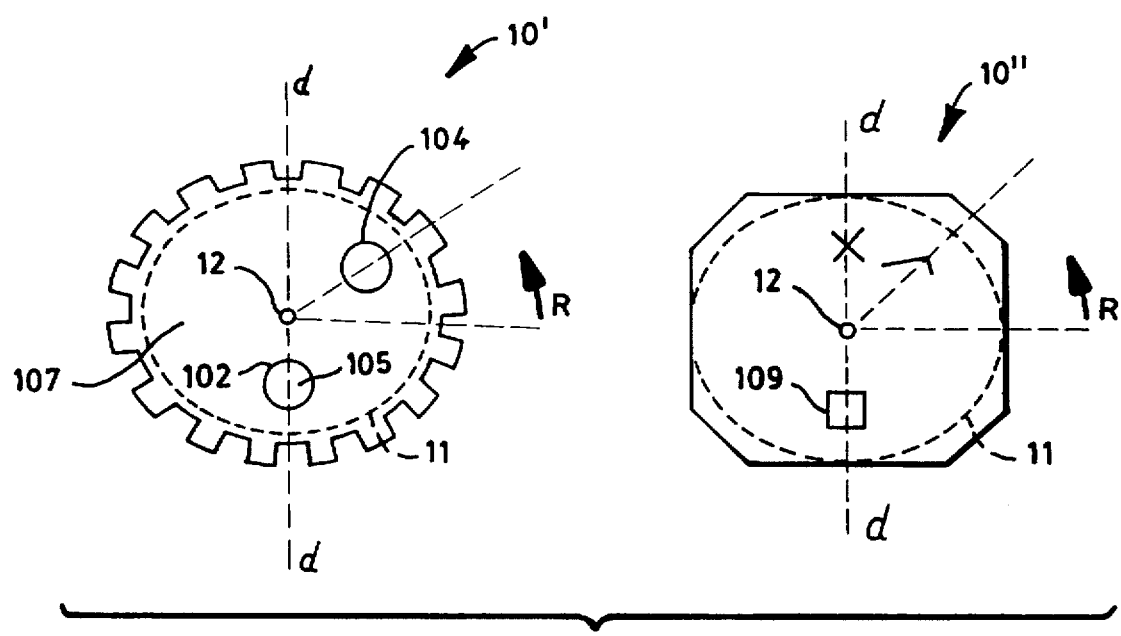
FIG. 2A illustrates varieties of flexible sheets useful for the manufacture of alternative embodiments of the present invention.

Although FIGS. 1A, 1B, and 2 illustrate the flexible sheet as having a circular shape, the present invention is not limited to any specific geometric shape. Other shapes can be used to benefit in varying embodiments. For example, FIG. 2A illustrates flexible sheets 10' and 10" having gear-like and polygonal shapes, respectively. Though there is no limitation as to shape, it will be appreciated that flexible sheets 10' and 10" enclose a predetermined circular area 11. For the purpose of the present invention, it is this definable circular area—not the extents of the flexible sheet 10—that determines the location of the "center" about which the flexible sheet is arcuately displaced. In the typical and more practical embodiment, flexible sheet 10 will be substantially circular, its extents being coextensive with the enclosed circular area.

Further, although FIGS. 1A, 1B, and 2 illustrate the flexible sheet 10 as being entirely light transmissive (i.e., prior to being doubled-over in a cross polarizing axis configuration), the ability of the present invention to vary the transmission of light therethrough is not contingent upon the use of an entirely light-transmissive polarizing (or non-polarizing) sheet. For example, for purposes of illustration, in the circular area 11 encompassed by the flexible sheet 10' illustrated in FIG. 2A, both light reflective (i.e., opaque) areas 107 and light transmissive areas, i.e. light-admitting holes 104 and 105, are provided. Light-admitting holes 104 and 105 can be actual holes through flexible sheet 10', or, for example, they can be the unpainted (or otherwise uncoated) areas of a painted transparent flexible sheet. In any event, when flexible sheet 10' is doubled-over, for example, along the diameter perpendicular to arbitrary reference line d—d, light-admitting hole 105 will be superimposed over a non-transmissive zone of reflective area 107. In this state, the passage of light through the resultant viewing window is blocked. However, when rotated 45° in direction R, light transmissive holes 104 and 105 meet and eventually overlap, such that the resultant opening and the light admitted therethrough can be gradually enlarged. Although devices that require only one such resultant variable light opening are encompassed by the present invention, more typically, useful variable light blocking devices (e.g., semi-circular window blinds) will employ a plurality of such holes of varying configurations and shapes (for example, slats).

It is further unnecessary in certain embodiments that the flexible sheet be used to regulate light transmission. For example, in variable information devices, a light-reflective flexible sheet (not shown) can be provided with information or like indicia on its facing surfaces, such that when the flexible sheet is doubled over and arcuately displaced in accordance with the present invention, the information displayed to a viewer changes. Alternatively, as in the flexible sheet 10" illustrated in FIG. 2A, the encompassed circular area 11 can contain an imprinted framing box 109 together with other such indicia (i.e., the check and cross). When the flexible sheet 10" is doubled-over along the diameter perpendicular to arbitrary reference line d—d, the framing box 109 provided thereon is initially superimposed over the x-mark, X, the combined images thus providing a first type of visual information. However, when flexible sheet 10" is displaced 45° in direction R, the framing box 109 ultimately comes into superposition over the check-mark, ✓, the combination thus providing a second type of visual information.

When flexible sheet 10 is a polarizing-type material, as in the preferred embodiment, generally any sufficiently flexible material that produces the desired light-polarization effect can be utilized. The preferred material is a synthetic dichroic plane polarizer, or alternatively, a transparent plastic sheet of polyvinylene, preferably polyvinylalcohol containing substantially oriented molecules of conjugated double bonds which provide its light-polarizing properties. The manufacture and utilization of such sheet material may be appreciated with reference to U.S. Pat. Nos. 2,173,304, 2,255,940, 2,306,108, 2,297,231, 2,455,555, 2,253,168, and 2,674,159; as well as U.S. patent application Ser. No. 08/565,877 now U.S. Pat. No. 5,666,223.

As the flexible sheet 10 is drawn through a rather tortuous path during arcuate displacement, a hard surface coating utilized on any or all external surface thereof is desirable to provide a durable, mar resistant surface. Useful materials would include melamine-formaldehyde condensation polymers, and polyalkylene glycol diesters of an $\alpha,\beta$-unsaturated carboxylic acid, such as polyethylene glycoldimethacrylate, etc. Such materials and techniques of application are disclosed in U.S. Pat. Nos. 2,397,242, 2,481, 809, 3,019,131, 3,091,192, and 3,097,106.

A typical flexible sheet—though not critical to the practice of the present invention—will comprise a polarizing film carried on a transparent plastic support and covered with a transparent synthetic plastic protective layer. Transparent synthetic plastic support materials utilized will generally comprise methyl methacrylate approximately 30 to 125 mils in thickness and preferably about 60 mils thick. The transparent synthetic plastic protective layers will generally comprise cellulose acetate butyrate from 4 to 30 mils in thickness and preferably about 5 mils thick, and the light-polarizing film will generally be from about 0.75 mils thick. From the standpoint of environmental stability, a particularly suitable polarizer panel for use herein is a dichroically oriented sheet of polyvinylene available from Polaroid Corporation as K sheet polarizer. Iodine stained polarizer designated HN 36 is also quite suitable.

Means for accomplishing arcuate circumferential displacement of the flexible sheet 10 about center 12 are several. FIGS. 3 to 9 provide tangible examples of a variety of such means. It is believed that a study of these examples will enable one skilled in the art to design and practice other like and/or functionally equivalent mechanisms, consistent with the scope of the present invention.

In FIG. 3, there is illustrated - in somewhat generic fashion—displacing means for frictionally urging the displacement of doubled-over flexible sheet 10. In this regard, a knob 60 is inserted, pushed into, or otherwise placed within an open end of the fold-forming means, i.e., slotted sleeve 20, such that the outer surfaces of knob 60 frictionally abut against the inner surfaces of doubled-over flexible sheet 10. Accordingly, when knob 60 is rotated in direction r, a correspondent arcuate displacement of the doubled-over flexible sheet 10 about a central point (see FIGS. 1A and 1B) in the direction R is effected. Knobs of such functionality can be provided at either or both ends of slotted sleeve 20.

The provision of frictional abutment is due in part to the nature of the materials from which the outer contacting surfaces of knob 60 and flexible sheet are made. Where flexible sheet 10 is made from a synthetic polarizing material, or any such plastic material, the preferred material for the outer contacting surface of knob 60 is rubber or like compressible resilient material. Further, as the frictional abutment of knob 60 against flexible sheet 10 will typically urge flexible sheet 10 against the inner walls of slotted sleeve 20, to prevent marring of the sheet 10, one can line the inner walls of slotted sleeve 20 with a low-friction, non-abrasive material, such a felt or cloth.

As illustrated in FIG. 3, it is desirable to provide an internal guide element 40 inside the slotted sleeve 20 within the "fold" or "bend" of the flexible polarizer. The internal guide 40 promotes a desirably gentle fold radius, thus reducing the likelihood and/or severity of sheet creasing, as well as preventing flexible sheet 10 from being inadvertently yanked through the slot 24. Although a desirable structural element, inasmuch as the arcuate displacement means can be designed to accomplish similar functionality, the incorporation of an internal guide element 40 is not critical to the practice of all envisioned embodiments of the present invention. Further, if incorporated there is no requirement that the internal guide element 40 span substantially throughout the inside of slotted sleeve 20, or be designed as a unitary structure. An internal guide element can comprise a plurality of rollers, or can be configured as wheel-like structure (not shown). Although not limited in shape, the internal guide means should preferably be cylindrical, arcuate, or edgeless, and have low friction surfaces, again to reduce the damage to the flexible sheet by the generally tortuous path of doubled-over rotation.

Clarifying and expanding upon the generic mechanisms illustrated in FIG. 3, FIG. 4 illustrates in more tangible detail a particular means for frictionally urging the arcuate circumferential displacement of doubled-over flexible sheet 10. As illustrated, the displacement means comprises a knob head 600 and—having connected thereto by axle 620—knob handle 630. In accordance with the general means depicted in FIG. 3, knob head 600 is inserted in an open end of the slotted sleeve 20 such that knob head 600 frictionally abuts against the doubled-over flexible sheet 10. Accordingly, when knob handle 630 is rotated in direction R, the motion is translated to knob head 60, thereby effecting arcuate circumferential displacement of the doubled-over flexible sheet 10. To maintain the knob head 600 in a position of lateral and axial contiguity with the outer circumferential area of sheet 10, as well as confine and make more permanent the assemblage, bearings 640 can be inserted in slotted sleeve 20 and a cap 610 screwed (or otherwise affixed) onto slotted sleeve 20. Both bearing 640 and cap 610 have a conduit through which axle 610 is inserted and allowed to rotate freely.

Embellishing upon the mechanisms of FIGS. 3 and 4, there is illustrated in FIGS. 5 and 6 sprocket means for urging the displacement of a doubled-over flexible sheet 10, the flexible sheet having cooperating peripheral perforations 65. As shown in FIG. 5, a sprocket wheel 62 can be placed in an open end of the fold-forming means (i.e., slotted sleeve 20) such that the sprockets 63 of wheel 62 engage with the cooperating peripheral perforations 65 provided on the outer circumferential area of doubled-over flexible sheet 10. Accordingly, when sprocket wheel 62 is made to rotate in direction r, displacement of the doubled-over flexible sheet 10 about a central point (see FIGS. 1A and 1B) in the direction R is effected.

Clarifying and expanding upon the generic mechanism illustrated in FIG. 5, FIG. 6 illustrates in more tangible detail a particular (and motorized) means for urging the displacement of a doubled-over flexible sheet 10. As illustrated, the displacement means comprises a sprocket wheel 62 and—having connected thereto by an axle—a rotatable cap handle 611. In accordance with the general means depicted in FIG. 5, sprocket wheel 62 is inserted in an open end of the slotted sleeve 20 such that the sprockets 63 of wheel 62 engage with the cooperating peripheral perforations provided in doubled-over flexible sheet 10. Accordingly, when cap handle 611 is rotated in direction R, the motion is translated to sprocket wheel 62, thereby effecting displacement of the doubled-over flexible sheet 10. To maintain the sprocket wheel 62 in a position of lateral and axial contiguity with the perforated outer circumferential area of sheet 10, as well as confine and make more permanent the assemblage, bearings 640 can be inserted in slotted sleeve 20, the bearings 640 itself abutting against cap handle 611.

It will be noted from FIG. 6, that cap handle 611 performs both primary functions provided individually by knob handle 630 and cap 610 in the displacement mechanism illustrated in FIG. 4, i.e., cap handle 611 functions both to maintain the displacement mechanism assemblage and to effect arcuate circumferential displacement of sheet 10. This is accomplished by the direct coaxial connection of sprocket gear 62 to cap handle 611, and the rotatable engagement of cap handle 611 onto slotted sleeve 20 by the use of an annular protuberance 613 rotably interlocked with a corresponding annular channel 615.

It will be further noted from FIG. 6, that internal guide means 40 can be configured as a hollow cylinder. The cavity within the internal guide means 40—as shown—can be used to house motorized means for displacing the doubled-over flexible sheet 10. Such arrangement effects greater portability and reduces the bulk of a finished unit. By reducing the amount of manipulation necessary to operate the device, motorized means also make the unit more convenient and safer for use while driving. As shown, the motorized means can comprise a series of batteries 654 electrically coupled to motor 652, the axle of motor 652 being connected co-axially to sprocket wheel 652. Switching mechanisms (not shown) for operating the motor are well-known in the art. Further, for sun visors, it is contemplated that photodetectors (not shown) and the like can be positioned on the outside of the slotted sleeve 20, the motor 652 being linked to and operated on the basis of signal inputs therefrom. Such arrangement would allow the dimming or clearing of the viewing window automatically in response to ambient lighting conditions.

In the arcuate displacement mechanisms illustrated in FIGS. 3 to 6, stabilization means against certain undesirable motions are generally desirable. In this regard, it will be readily appreciated that the two flaps are desirably maintained at substantially equal extensions out of the slotted sleeve 20. As discussed above, this can be prevented by the use of a spindle 30. While such means are generally sufficient, under conditions of frequent and repeated use, damage to hole 12 may be suffered, resulting in the skewing or meandering of the flexible sheet 10. Accordingly, additional stabilization means would be desirable. These could be provided in the form of interlocking, but slidable rails provided around the periphery of the two flaps. Such an arrangement is combined with the arcuate displacement means illustrated in FIGS. 7-9.

In FIG. 7, tab means are used for urging the displacement of a doubled-over flexible sheet 10. In this regard, there is provided on the outer edges of both flaps of doubled-over flexible sheet 10 slidably engaged rails 602 and 606. Rail 602 comprises a tab 603 and a groove 604. Rail 606 comprises a tab 607 and—as shown in FIG. 8—a track 606, substantially coextensive with and interlocked in groove 604. By moving rail 606 in direction $R_{606}$ while moving rail 602 in the counterdirection $R_{602}$—i.e., by bringing together tabs 603 and 607—doubled-over flexible sheet 10 is displaced arcuately relative to the center of its circular area.

The single pair of rails 602 and 606 with a single pair of spaced apart tabs 603 and 607 are generally operated by the use of two hands, and accordingly are not well-suited for operation when driving. In a variation (not shown) of the same mechanism better suited for operation during driving, two opposing pairs of more closely spaced tabs are provided on the single pair of rail 602 and 602. By reducing sufficiently the maximum possible distance between the tab pairs on the respective rails, an operator would be able to pinch together with a single hand the tabs on a first pair, thereby effecting arcuate displacement as well drawing apart the tabs on the second pair. If desired thereafter, the operator can pinch together with a single hand the "drawn-apart" tabs on the second set, thereby effecting a reverse arcuate displacement as well as urging apart the tabs on the first set. While more closely spaced tabs reduce the potential range of displacement, and thus the potential range of variable light transmission, a full range from maximum transmission to maximum absorption is not required for standard driving conditions.

Regardless of its particular embodiments and construction, the devices according to present invention can be put to many beneficial uses, the primary ones of which are illustrated in FIGS. 10 to 16.

FIG. 10 illustrates a variable-light transmission device according to the present invention, the device being configured for and used as a supplementary car visor. As shown, the supplementary car visor is attached to the primary sun visor 800 of an automobile by hinge clips 710 provided on slotted sleeve 20. Supplementary car visor can be swung up or down by a driver as desired.

Aside from use as a supplementary sun visor, the variable light transmission device can also be configured with appropriate connection means to permit placement of the adjustable sun visor wherever needed. For example, as shown in FIG. 11, by using an pin 717 and hinge 27 construction with suctions cups 717 (or alternatively, magnets, adhesives, VELCRO, and the like) the device can be attached to a variety of flat surfaces, such as a car's front, side, or rear windows.

Another desirable sun visor embodiment is illustrated in FIGS. 12 to 15. Therein, FIG. 12 illustrates a first side 200a of the visor and FIG. 13 illustrates the corresponding second side 200b. Assembled, the two sides 200a and 200b of the visor are brought together as shown in FIG. 15 and facilitated by the attachment points 213, sandwiching therebetween a double-over flexible polarizing sheet. The visor of FIGS. 12 to 15 is essentially the slotted sleeve 20 of FIGS. 1A with framing extensions 215a and 215b extending and continuing down from the respective opposing walls 26 of slot 24. The framing extensions 215a and 215b adds a rigid outer protective encasement, and thereby insulating the flexible sheet from being bent or torn as a result of accidental shocks and blows resultant of clumsy handling, manipulation, or storage. Further toward this end, light-transmissive rigid glass or plastic panels can be inset within the frame of each of the visors sides 200a and 200b to thereby further shield and physically protect the housed flexible sheet.

Further, as illustrated in FIG. 12, extension 215a can be provided with a ledge 210, said ledge 210 defining an area within which the "sandwiched" doubled-over flexible sheet is housed. Confined within such area, the meandering or skewing of the flexible sheet during operation is curtailed. Accordingly, the need for stabilizing means, such as a spindle 30, is reduced, and can be, if desired, eliminated. For attachment, extensions 215a and 215b are provided with respective parts 27a and 27b, parts 27a and 27b providing a socket when the respective sides 200a and 200b are assembled. As shown in FIG. 14, a pin 721 of clip 720 inserted in to the socket provided by assembled parts 27a and 27b, the clip 720 capable of being mounted onto a primary car visor 800. The retracted and open positions of the sun visor and the underlying mechanics will be apparent from the diagram illustrated in FIG. 15.

Since certain changes may be made in the above product without departing from the scope of the invention involved, it is intended that all matter contained in the above description or shown in the accompanying drawings shall be interpreted as illustrative and not in a limiting sense.

I claim:

1. A variable light transmission device comprising a flexible sheet having extents encompassing a circular area and at least one light-transmissive region within said circular area, said flexible sheet doubled-over upon itself along the center of said circular area such that the respective resultant halves of said circular area overlap to form a first and a second semicircular region, thereby producing a field of view; and fold-forming means for maintaining the overlapping configuration of said doubled-over flexible sheet, yet allowing said flexible sheet to be displaced arcuately about the center of said circular area within the doubled-over configuration, whereby the transmission of light through said field of view can be varied by said displacement of said doubled-over flexible sheet.

2. The variable light transmission device of claim 1, wherein said flexible sheet is a synthetic linear light polarizer.

3. The variable light transmission device of claim 2, wherein said synthetic linear light polarizer is a dichroically stained, molecularly oriented sheet of polyvinyl alcohol.

4. The variable light transmission device of claim 2, wherein said synthetic linear light polarizer is a dichroically oriented sheet of polyvinylene.

5. The variable light transmission device of claim 1, further comprising an internal guide member around which said flexible sheet is doubled-over.

6. The variable light transmission device of claim 5, wherein said internal guide member is a cylindrical internal guide member.

7. The variable light transmission device of claim 1, wherein said fold-forming means comprises a slotted sleeve.

8. The variable light transmission device of claim 5, wherein said slotted sleeve is provided with a frame extension continuous with the slot of said sleeve and within which said flexible sheet is doubled-over.

9. The variable light transmission device of 7, wherein said slotted sleeve has a roundish interior channel running along the length of said slotted sleeve.

10. The variable light transmission device of claim 9, further comprising an internal guide member around which said flexible sheet is doubled-over, said internal guide member being inside said roundish interior channel of said slotted sleeve, said first and second semicircular regions extending out of said slotted sleeve through said slot.

11. The variable light transmission device of claim 6, wherein said fold-forming means comprises a first flap restraining means to assist in maintaining the position of said first flap in said overlapping configuration and a second flap restraining means to assist in maintaining the position of said second flap in said overlapping configuration.

12. The variable light transmission device of claim 11, wherein said first and second flap restraining means are first and second rotatable cylindrical rollers.

13. The variable light transmission device of claim 1, further comprising a spindle, said flexible sheet having a hole at said center, said spindle being inserted into said hole, whereby said flexible sheet is displaceable arcuately about said spindle.

14. The variable light transmission device of claim 7, further comprising a spindle, said flexible sheet having a hole at said center, said spindle being inserted into said hole, whereby said flexible sheet is displaceable arcuately about said spindle.

15. The variable light transmission device of claim 1, further comprising means for displacing arcuately said flexible sheet about said center.

16. The variable light transmission device of claim 15, wherein said means for displacing comprises at least an axially-rotatable knob, said knob engaged with said flexible sheet such that the operation of said knob effects arcuate displacement of said flexible sheet about said center.

17. The variable light transmission device of claim 16, wherein said knob is configured with a rubber surface, whereby the engagement of said knob with said flexible sheet is effected by frictionally-maintained contact between said knob and said flexible sheet.

18. The variable light transmission device of claim 16, wherein said knob is configured with sprockets and said flexible sheet is provided with cooperating holes in a circumferential zone around said circular area, whereby the engagement of said knob with said flexible sheet is effected by the engagement of said sprockets with said cooperating holes.

19. The variable light transmission device of claim 15, wherein said flexible sheet is provided with a first tab associated with said first semicircular region and a second tab associated with said semicircular region, said first and second tabs displaceable one from the other, thereby providing said means for displacing said flexible sheet about said center.

* * * * *